United States Patent Office 2,817,578
Patented Dec. 24, 1957

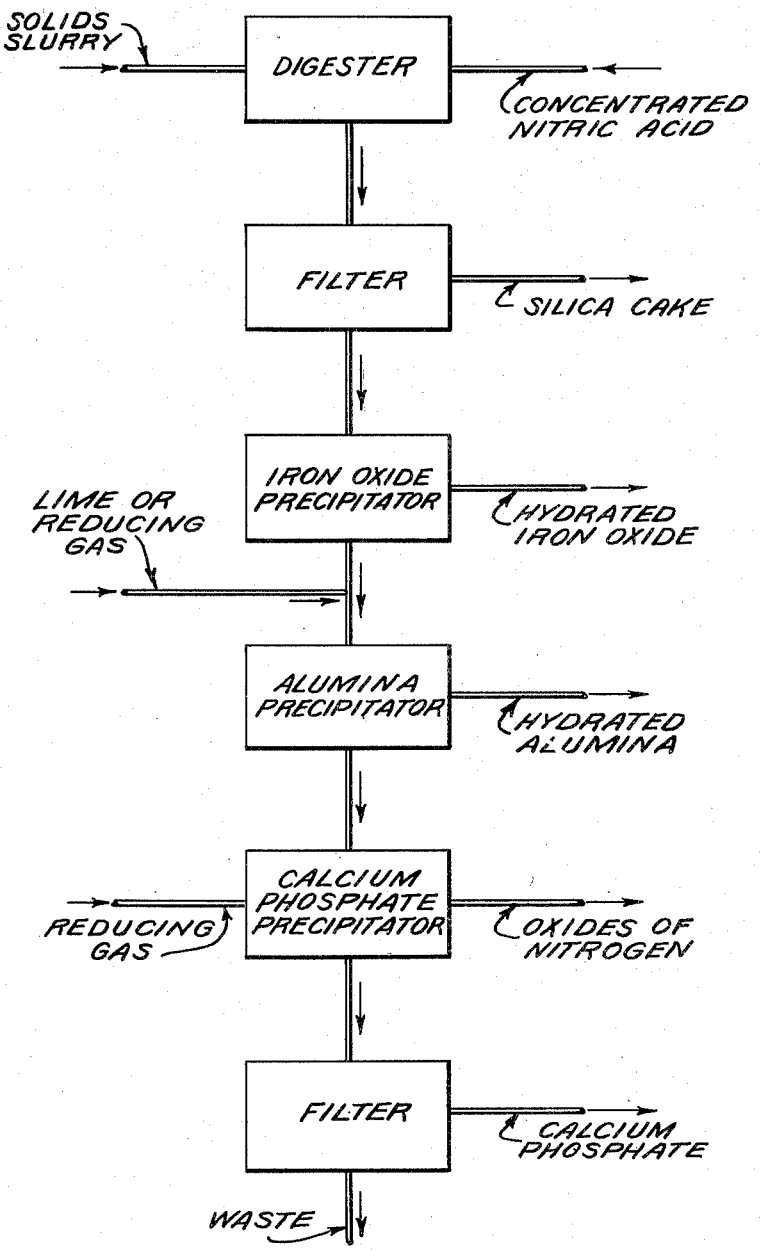

2,817,578

PURIFICATION OF ALUMINA AND PHOSPHATES

Thomas Henry Milliken, Jr., Moylan, Pa., assignor to Houdry Process Corporation, Wilmington, Del., a corporation of Delaware Application August 31, 1953, Serial No. 377,534

5 Claims. (Cl. 23—109)

The present invention relates to a method for the separation of high grade alumina from various materials containing mixtures of iron and aluminum, and relates particularly to the production of refined alumina from natural clays containing appreciable amounts of iron. The invention relates also to the production of refined alumina and high-grade phosphates from lower grade phosphate rocks containing appreciable amounts of clays.

The presence of iron in the aluminas of commerce is very objectionable. This is particularly true in the case of alumina to be used in the production of metallic aluminum. Iron is, moreover, undesirable as a component of aluminas to be used for the preparation of catalysts and catalyst supports such as the familiar activated alumina used abundantly in the petroleum industry. Aluminas to be used in the production of glass, ceramics, and refractories, for example, should also be relatively free of iron.

Crude aluminum salts and liquors available from industrial processes may also contain large amounts of alumina accompanied by iron impurities. Such compositions may be readily treated by the process of the present invention to recover the alumina in acceptably pure state.

Certain natural clays contain appreciable amounts of phosphates and many of the lower grade phosphate rocks are fairly rich in clay. The commercial processing of these minerals presents a difficult problem because the clays often are not of sufficiently high alumina content to be attractive for alumina recovery by conventional methods where alumina is the principal product. Similarly, it often is not economically feasible as a commercial practice to process these clay-rich phosphate rocks by known methods for recovery of their phosphate content.

By the methods of the present invention a high-grade alumina can be obtained from an iron-contaminated argillaceous material, and the invention also provides an economic and feasible method by which argilliferous phosphate rocks can be converted to high-grade alumina with the production of good grade calcium phosphates.

Broadly stated in accordance with the invention, a highly concentrated acid solution of alumina containing objectionable amounts of iron impurities, such as a liquor obtained by acid digestion of an iron-contaminated aluminaceous mineral, is subjected under pressure to selected conditions including elevated temperature and controlled acidity to cause selective precipitation of the iron impurity. During precipitation of the iron the temperature and acidity of the solution are preferably carefully regulated and maintained at predetermined values. After separating the precipitated iron from the thus purified solution, the acidity of the solution is preferably reduced and the purified solution is subjected to a more highly elevated temperature sufficient to cause the dissolved alumina to precipitate therefrom as highly refined hydrated alumina substantially free of impurities such as calcium, magnesium, sodium and phosphate, which remain dissolved in the solution.

The invention, as applied to the processing of clay-rich phosphate rock type materials, comprises digesting the raw material in a concentrated acid solution, preferably a concentrated nitric or hydrochloric acid solution, under conditions properly chosen to dissolve the alumina and calcium phosphate constituents from the raw material. After separating the insoluble silicious material from the solution, and adjusting the acidity and solids concentration to predetermined values, the solution is heated under pressure sufficient to maintain the liquid phase, such as by maintaining the same in an enclosed vapor-tight system, to temperatures sufficient to cause precipitation of hydrated iron oxide from the solution. The precipitated iron oxide is separated from the solution, and the purified solution is further heated to a higher temperature to cause pure hydrated alumina to precipitate from the solution. Also, the acidity of the solution is preferably lowered to a predetermined value and both the acidity and temperature of the solution are preferably controlled at predetermined values during precipitation of the alumina. After the alumina precipitate is separated from the resulting solution, the solution is contacted with a reducing gas such as hydrogen, carbon monoxide or mixtures of the two to decompose the acid in the solution and thus reduce the acid concentration sufficiently to cause phosphate to precipitate from the solution as calcium acid phosphates. During this reducing operation the temperature and acidity are preferably also adjusted and controlled at predetermined values to accomplish rapid and efficient reduction of the acid and precipitation of the phosphates. The calcium phosphates are separated and recovered from the resulting solution, and the solution may, in turn, be discharged to waste. Both the separated alumina and calcium phosphate may be treated in any desired manner to prepare them for use or sale in commerce.

A more detailed description of a specific embodiment of the method of the invention as applied to a clay-rich phosphate rock is presented below with reference to the flow sheet illustrated in the accompanying drawing.

The raw material is preferably finely ground and slurried to form a roughly 35 weight percent solids slurry in water. This slurry is fed preferably continuously at a controlled rate into a digestor.

At the same time, a controlled amount of about 55 to 60 weight percent nitric acid is also fed into the digestor. The concentration of the nitric acid used is determined by such considerations as the composition of the raw material and the relative difficulty of digesting the solids particles at the chosen digestion temperature. An elevated digestion temperature is usually chosen to speed up the digestion process. Digestion temperatures below about 200° F., preferably in the range of about 180° to 200° F., have been found to be satisfactory and are preferable to avoid the necessity of using high pressure digestor equipment. A series of digestor tanks may be used and each tank may, in turn, be put through a cycle of operations consisting of charging, digesting and discharging steps. The tanks may be steam-heated and agitated by means of paddle stirrers. The dimensions of the tanks and the total number may be chosen so that substantially continuous operation is had at the required digestion time. Digestion times in the range of 2 to 12 hours are generally employed.

The hot digestor effluent is a mixture of insoluble silicious matter and a concentrated solution of primarily aluminum and calcium compounds in nitric and phosphoric acid. This effluent is preferably filtered hot in a continuous filter, such as one of the rotating drum or centrifugal types available on the market, in which the silica cake and the filtrate are continuously discharged. The filtrate is expelled from the filter to an iron oxide precipitator. Alternatively, the hot digestor effluent may be cooled and filtered in a batch type filter. The filter cake is generally washed with water and the washings may be added to the filtrate to dilute the filtrate. Additional water may be added to the filtrate to produce the desired degree of dilution. The concentration of the solution at this stage is preferably adjusted so that the combined aluminum plus iron nitrate concentration falls in the range of about 10 to about 15 percent by weight.

In the iron oxide precipitator the acidity of the filtrate solution is adjusted either by the addition of the proper amount of concentrated nitric acid or lime, to give a medium to high excess of acid. The excess of acid chosen will depend upon the composition of the solution, the concentration of the various components, especially the iron concentration and the temperature at which the iron precipitation is to be performed. In general, the excess or uncombined acid should preferably be in the range of about 5 to about 25 percent by weight of the total nitrates present in the filtrate solution. The temperature of the solution in the precipitator is elevated to a value above 212° F., preferably above 240° F. The temperature is selected with a view to producing a rapid and complete precipitation of the iron impurity in a readily filterable form, such as a granular or crystalline form rather than a gelatinous or slimy form. Precipitation temperatures in the range of about 240° F. to about 350° F. are preferred. The higher temperatures in this range result in more rapid precipitation and more readily filterable precipitates. The precipitation may conveniently be conducted in pressure vessels lined with ceramic material, stainless steel or other acid resisting material. A series of precipitation vessels may be used so that each vessel can, in turn, be operated cyclically in a manner similar to that described in connection with the digestion operation.

The iron oxide slurry is withdrawn from the bottom of the iron oxide precipitator and is filtered in either a continuous type filter or a batch type filter as described above in connection with the digestor effluent. This operation is not shown in the drawing to avoid unnecessary complication of the flow sheet.

The clear mother liquor from the iron oxide precipitator or precipitators also may be filtered, if desired, but in general it is not necessary to perform such a filtration. In any event, this mother liquor is charged to an alumina precipitator. The filtrate from the iron oxide filtration, or filtrations, is added to the mother liquor in the alumina precipitator.

The acidity of this combined liquor is reduced either by the addition of a base such as lime or by contacting the liquor with a reducing gas such as carbon monoxide, hydrogen or mixtures of carbon monoxide and hydrogen, for example. This latter method of acidity reduction, which results in the production of oxides of nitrogen from the excess nitric acid, when this acid is employed in the process, will be discussed below in more detail. The excess acidity is preferably reduced to a value in the range of about 2 to about 5 percent excess acid by weight of the aluminum nitrate in the liquor. The temperature of the acid-adjusted liquor is elevated by means of suitable heaters to a value above 350° F., preferably in the range of about 400 to 500° F. Higher temperatures may be employed but practical considerations dictate the use of temperatures below about 600° F. to avoid high vapor pressures and increased rates of equipment corrosion. The acidity and temperature conditions are selected to accomplish the precipitation of microcrystalline hydrated alumina of the desired purity at a commercially practical rate. In this precipitation also, the alumina may be fractionally precipitated or crystallized from a series of alumina precipitators using carefully chosen acidity and temperature gradients as described in connection with the iron oxide precipitation above. The alumina precipitators employed are preferably ceramic or stainless steel lined and are preferably of elongated shape and positioned with their large axes vertical. In any case, the precipitated alumina is separated from the mother liquor by any suitable method, such as by the sedimentation and filtration methods described above in the separation of the iron oxide from its mother liquor.

This description of a specific embodiment of the invention up to this point, as applied to the treatment of clay-rich phosphate rock serves also to describe the broader embodiments of the invention directed to the separation of high-grade alumina from mixtures of iron and alumina and to the production of alumina from natural clays containing appreciable amounts of iron with the exception that other acids may be used instead of nitric acid. Examples of such other preferred acids are hydrochloric acid and sulfuric acid, but in general strong acids capable of dissolving alumina from clays may be used, although not necessarily with as great advantage as the acids named above.

Nitric acid, because of its property of being reducible to oxides of nitrogen by reducing gases such as carbon monoxide and hydrogen, is to be preferred over other acids for the specific embodiment of the invention as applied to clay-rich phosphate rock when it is desired to recover the acid as oxides of nitrogen or to produce calcium phosphate. The description of the invention as applied to clay-rich phosphate rock and using nitric acid solutions is resumed below.

The separated alumina mother liquor is rich in calcium salts, and nitric and phosphoric acids. This liquor is charged to a calcium phosphate precipitator where the temperature of the solution is adjusted to a value preferably below about 200° F. The temperature is not critical but it is elevated to speed the chemical reaction. Temperatures in the range of about 150° F. to about 200° F. are especially preferred. A reducing gas, preferably containing carbon monoxide, is intimately contacted with the solution in the precipitator in any suitable manner to saturate the solution with the reducing gas. This saturation is preferably accomplished at pressures of the order of about 200 to 300 pounds per square inch gauge to increase the solubility of the reducing gas in the solution. During this operation the gas reacts with the excess nitric acid in the solution and decomposes the acid to produce, among other products, gaseous oxides of nitrogen. These gaseous oxides of nitrogen are evolved from the solution and are withdrawn from the calcium phosphate precipitator together with unreacted reducing gas. The oxides of nitrogen are separated from the unreacted reducing gas and are converted to concentrated nitric acid by conventional methods in standard equipment. Descriptions of methods and equipment for these operations can be obtained from the published art. The nitric acid produced in this way is recirculated to the system for reuse in the digestor to digest the feed material to the process.

After the nitric acid concentration of the solution in the calcium phosphate percipitator has been lowered sufficiently, calcium hydrogen phosphates precipitate from the solution. As more nitric acid and nitrates are converted to oxides of nitrogen more and more calcium phosphates precipitate until substantially all the available calcium phosphate is precipitated from the solution. If the calcium and phosphate contents of the solution were properly balanced all of the calcium and all of the phosphate will be precipitated from the solution at this stage. Should there be an excess of nitrate remaining in the solution at this point, the reducing reaction is preferably continued until substantially all the nitrates are reduced to recoverable oxides of nitrogen. The precipitated calcium phosphates are then separated from the mother liquor produced in the calcium phosphate precipitator by any suitable method, such as by filtration. The separated phosphates may be washed and dried and are then available for use or sale in commerce.

Relatively concentrated solutions of aluminum and iron salts and of acid are employed in the method of the invention because such solutions are more stable than relatively dilute solutions wherein the aluminum and iron salts are sufficiently unstable to hydrolyze and precipitate iron oxide and alumina together at ordinary atmospheric temperatures. Furthermore, in the more concentrated salt and acid solutions there is appreciable temperature difference between the temperatures at which iron salts and aluminum salts hydrolyze, respectively. This appreciable temperature difference in concentrated solutions leads to sharper and cleaner separations of iron oxide from alumina.

Among the more important advantages of the method of the invention for the production of high-grade alumina over such known methods as the Bayer process is the fact that aluminas of as low as about 0.1 percent $Na_2O$ may be produced whereas aluminas produced by previously known methods contain about 0.4 to 0.8 percent $Na_2O$. Other advantages will be apparent from the above description and the examples which follow.

*Example I*

A sample of finely ground kaolin amounting to 200 parts by weight, after calcination at 1200° F. and subsequent cooling, was treated with 500 parts by weight of an aqueous solution of nitric acid (containing 40% $HNO_3$) for approximately 2 hours at temperature in the range of 190 to 200° F. The effluent from this treating was filtered and the undissolved matter discarded after washing. The filtrate plus the washings contained 189 parts of $Al(NO_3)_2$, 6.5 parts of $Fe(NO_3)_2$, 27 parts of $HNO_3$, and approximately 300 parts of water.

This solution was placed in a stainless steel bomb and was heated to about 300° F. at which temperature it was held for one hour under a pressure of 65 p. s. i. g. (pounds per square inch gauge). The bomb was quenched rapidly in cold water, and the contents were filtered. The material remaining on the filter was washed, dried and ignited. This material amounted to 6.8 parts and consisted of 62% iron oxide with the balance principally alumina.

The filtrate and washings from the immediately preceding filtration were placed in a stainless steel bomb and sufficient carbon monoxide was added to reduce the free nitric acid to less than 5% of the total liquid (the bomb containing in addition to the liquid, about one liter of free space was pressured with CO to about 150 p. s. i. g.). The bomb temperature was raised to about 400° F. and maintained for one hour and then quenched in cold water. The contents were filtered and the precipitate was washed, dried and ignited. The ignited precipitate amounted to 86 parts and consisted mainly of $Al_2O_3$ with only 0.06% by weight (by analysis) of $Fe_2O_3$.

*Example II*

A sample of low-grade phosphate rock was processed to recover alumina and the phosphate values. The sample of rock, finely ground and analyzing 19.1% $P_2O_5$, 14% CaO, 10.3% $Al_2O_3$, 3.9% $Fe_2O_3$, 41.4% $SiO_2$ and the remainder as trace elements and volatiles, amounted to 100 parts by weight. This sample was treated with 200 parts by weight of 40% nitric acid for 2 hours at 200° F. The liquid solution was recovered by filtration and was placed in a stainless steel bomb and heated for 2 hours at 300° F. under 65 p. s. i. g. The bomb was quenched rapidly in cold water and the contents were separated by filtration.

The insoluble material was washed, dried and calcined and was found to be 5.2 parts of which 70.5% was $Fe_2O_3$. The filtrate and the washing were combined and placed in a stainless steel bomb and heated for 4 hours at approximately 450° F. and 450 p. s. i. g. The bomb was quenched rapidly in cold water and the contents separated by filtration. The precipitate amounted to 9.8 parts of alumina and contained less than 0.1% $Fe_2O_3$ and 0.08% $P_2O_5$. The liquid portion, separated from the alumina, was placed in a stainless steel bomb and 29.2 parts of carbon monoxide added and the whole was treated at approximately 150 p. s. i. g. and 300° F. for 2 hours. The resulting slurry was dried and was found to comprise mainly a mixture of 18.3 parts of calcium nitrate and 32.8 parts of calcium dihydrogen phosphate, $$Ca(H_2PO_4)_2$$

Obviously many modifications and variations of the invention as hereinbefore set forth may be made without departing from the spirit and scope thereof and therefore only such limitations should be imposed as are indicated in the appended claims.

What is claimed is:

1. A method of producing refined alumina and calcium phosphates from an alumina-containing phosphate rock contaminated with minor amounts of iron compounds which comprises: digesting the phosphate rock in a concentrated nitric acid solution to dissolve the alumina and calcium phosphate constituents of the rock; subjecting the aqueous acidic solution in an enclosed system at liquid phase conditions and superatmospheric pressure to an elevated temperature in the range of 240° F., to 350° F., at which hydrated iron oxide is precipitated from the nitric acid solution; separating the hydrated iron oxide contaminant from the purified solution; subjecting the purified solution containing uncombined nitric acid constituting from 2 to 5 percent by weight of the aluminum nitrate present in the solution at liquid phase conditions at superatmospheric pressure to an additionally elevated temperature in the range of 400° F. to 600° F., at which hydrated alumina is precipitated from the purified acidic solution; separating and recovering the precipitated alumina from the purified acidic solution; contacting the purified acidic solution with a reducing gas to reduce and decompose the nitrate components of the purified solution and precipitate therefrom calcium phosphates; and separating and recovering the calcium phosphates from the system.

2. A method of producing refined alumina and calcium phosphates from an alumina-containing phosphate rock which comprises: digesting the phosphate rock in a concentrated nitric acid solution to dissolve the iron contaminants, the alumina, and the calcium phosphate constituents of the rock thereby forming a solution containing excess nitric acid amounting to from 5% to 25% by weight of the nitrates; subjecting the aqueous solution under pressure in an enclosed system to a temperature above about 240° F., but no higher than 350° F., to precipitate hydrated iron oxide from the solution; separating the hydrated iron oxide from the purified solution; subjecting the purified solution to reducing gas of the group consisting of carbon monoxide, hydrogen and mixtures of carbon monoxide and hydrogen to reduce the excess nitric acid to the range of about 2 to about 5 percent by weight of the aluminum nitrate present in the solution; subjecting the less acidic solution to a temperature in the range of 400° F. to 600° F. under pressure and at liquid phase conditions to precipitate hydrated alumina therefrom; separating and recovering the precipitated alumina from the purified solution; contacting the purified solution with a reducing gas of the group consisting of carbon monoxide, hydrogen and mixtures of carbon monoxide and hydrogen to decrease the concentration of nitrate iron to a sufficiently small amount to precipitate calcium phosphates; and separating and recovering the thus precipitated calcium phosphates.

3. A method of producing purified alumina from an ore containing iron contaminants which includes the steps of: digesting the ore in a concentrated nitric acid solution to dissolve the alumina constituents of the ore; separating the acid insoluble material from the aqueous solution of aluminum nitrate; subjecting the resulting aluminium nitrate solution containing excess nitric acid in an enclosed system at liquid phase condition and at superatmospheric pressure to a temperature in the range of above about 240° F., and no higher than about 350° F., for not more than about 2 hours to precipitate hydrated iron oxide from the solution; separating the hydrated iron oxide from the aqueous solution of aluminum nitrate and nitric acid; subjecting the purified solution to a temperature above about 400° F., but no higher than 600° F., at superatmospheric pressure to precipitate hydrated alumina from the purified solution; and separating and recovering the precipitated alumina.

4. A method according to claim 3, wherein said concentrated nitric acid solution heated to 240–350° F., contains an excess of uncombined nitric acid in the range of about 5 to about 25 percent by weight of the total nitrates present in the solution and the solution heated to 400–600° F., contains an excess of uncombined nitric acid in the range of about 2 to about 5 percent by weight of aluminum nitrate present in the solution.

5. A method of producing refined alumina from an aqueous solution of aluminum nitrate containing nitric acid in the range of from about 5 to about 25% of the total nitrates and containing significant amounts of iron contaminants which comprises: subjecting the solution in an enclosed system to an elevated temperature in the range of 240° F., to about 350° F., and at liquid phase conditions thereby precipitating hydrated iron oxide from the nitric acid solution; separating the thus precipitated hydrated iron oxide from the nitric acid solution; subjecting the solution to an additionally elevated temperature in the range of 400° F. to 600° F., and at liquid phase conditions; said solution containing an excess of uncombined nitric acid in the range of about 2 to about 5 percent by weight of aluminum nitrate present in the solution; thereby, precipitating hydrated alumina from the solution; and separating and recovering from the solution the precipitated alumina substantially free from iron.

References Cited in the file of this patent
UNITED STATES PATENTS

| | | |
|---|---|---|
| 1,057,876 | Peacock | Apr. 1, 1913 |
| 1,354,824 | Goldschmidt | Oct. 5, 1920 |
| 1,792,410 | Buchner | Feb. 10, 1931 |
| 2,019,553 | Wilmore | Nov. 5, 1935 |
| 2,019,554 | Deer | Nov. 5, 1935 |
| 2,104,295 | De Varda | Jan. 4, 1938 |
| 2,127,504 | Deer et al. | Aug. 23, 1938 |

OTHER REFERENCES

Department of Commerce, Bureau of Mines, Acid Processes for the Extraction of Alumina, Tilley et al., Bulletin 267, 1927.